United States Patent [19]

Grimm et al.

[11] 4,271,213
[45] Jun. 2, 1981

[54] FUSED, THERMOPLASTIC PARTITIONING AGENT AND PREPARATION OF CRUMB RUBBER COATED THEREWITH

[75] Inventors: Donald C. Grimm, Tallmadge; Hanford L. Gunnerson, Akron, both of Ohio

[73] Assignee: The Goodyear Tire & Rubber Company, Akron, Ohio

[21] Appl. No.: 111,153

[22] Filed: Jan. 11, 1980

Related U.S. Application Data

[63] Continuation of Ser. No. 675,402, Apr. 9, 1976, abandoned.

[51] Int. Cl.³ .................................................. B44D 1/02
[52] U.S. Cl. ................................. 427/222; 106/308 M; 428/407; 260/816 G; 260/29.7 UA
[58] Field of Search ..................... 428/407; 260/42.14, 260/816 G; 427/222; 106/308 M

[56] References Cited

U.S. PATENT DOCUMENTS 3,813,259  5/1974  Neubert ............................... 427/222

Primary Examiner—Sam Silverberg
Attorney, Agent, or Firm—J. Y. Clowney

[57] ABSTRACT

A fused, thermoplastic partitioning agent for elastomeric crumb materials is prepared from polymethyl methacrylate and a resinous styrene-butadiene copolymer.

16 Claims, No Drawings

FUSED, THERMOPLASTIC PARTITIONING AGENT AND PREPARATION OF CRUMB RUBBER COATED THEREWITH

This is a continuation of application Ser. No. 675,402 filed Apr. 9, 1976 now abandoned.

PRIOR ART

Neubert U.S. Pat. No. 3,813,259 discloses the use of resinous butadienestyrene copolymer and polymethyl methacrylate as partitioning agents, individually, but does not suggest that any mixture of them be employed.

THE INVENTION

It is well known that elastomers including natural rubber and synthetic rubbers such as polyisoprenes, polybutadienes, copolymers of styrene and acrylonitrile with isoprene or butadiene, etc., made by emulsion, solution or suspension processes, are tacky. When coagulated from the latex form in which they occur naturally or in which they are polymerized, the elastomer particles tend to agglomerate unless they are agitated vigorously. When dry they are even more tacky and special means must be employed if it is desired to maintain the elastomer in the form of discrete particles.

It is an object of this invention to coat elastomeric crumb particles with a fused resinous partitioning agent to prevent agglomeration during drying, storage, shipping and handling. The word "crumb" is used herein to refer to the individual particles or agglomerates formed in coagulation processes, or to pellets formed by cutting extruded elastomers, or to particles formed by grinding larger masses of the elastomers. The crumb particles produced by coagulation or grinding may generally be considered as having diameters of about 1 to 15 mm.; and if produced from an extruded strand may measure as much as 50 mm. in any direction.

Various resinous polymers may be employed as fused thermoplastic partitioning agents for elastomeric crumb materials, such as polystyrene, polymethyl methacrylate, polyacrylonitrile, polyvinyl chloride, polyethylene, and various copolymers and terpolymers of styrene, butadiene, acrylonitrile, methyl methacrylate, etc. The satisfactory use of a resinous polymer for the purpose of this invention depends on its agglomeration temperature. The agglomeration temperature is that temperature at which particles of the resin dispersed in water will soften and mass together. For the process for applying the coating of thermoplastic resin to the rubber crumb in aqueous slurry as included herein to be practical and economical it should be conducted at slurry temperatures below about 99° C. Higher temperatures may be used but they require the process to be conducted in a pressure vessel under pressure. The coating is best applied at a slurry temperature at or near the agglomeration temperature of the resinous coating material.

The Neubert patent refers to the use of polymethyl methacrylate as a partitioning agent. Polymethyl methacrylate, alone, with an agglomeration temperature over 100° C. can be applied to a powdered rubber (up to about 1 mm in diameter) at temperatures under the boiling point of water or slurries of a rubber crumb. However, when it is attempted to apply the polymethyl methacrylate resin as a coating to larger-size crumb particles of the elastomer, under conditions such as included herein, much of the resin coagulates by itself and forms free resin particles rather than forming a fused coating on the crumb rubber.

Neubert refers to the use of a resinous styrene-butadiene copolymer with a styrene content of 80–99 percent by weight. He refers to it as a preferred partitioning agent. Such copolymer may be used in the fused blend described herein. Copolymer of a lesser styrene content, such as 80–85 percent is preferred for blending with polymethyl methacrylate. Any such copolymer resin with an agglomeration temperature such as 55°–70° C. may be applied very readily as a partitioning agent to the surface of crumb particles. However, its agglomeration temperature is so low that the resulting resin-coated crumb particles must be dried at rather low temperatures to avoid their sticking together during drying. A drying temperature of above about 60° C. would cause the rubber crumb particles coated with such copolymer to stick together. The use of such a low drying temperature of about 60° C. is uneconomical because of the slow rate of evaporation of the water held in the crumb. On the other hand, polymethyl methacrylate resin, while not adhering to the surface of the particles as well as the styrenebutadiene copolymer will permit the crumb coated with it to be dried at a much higher temperature of, for example, 95° C. or higher, without sticking together to any appreciable extent, due to its very high agglomeration temperature.

Whereas polymethyl methacrylate is a preferred ingredient to be used in the partitioning agent of this invention, other resins of very high agglomeration temperatures could be used in place of it, such as, for example, polystyrene or polyvinyl chloride, as well as a copolymer of styrene and acrylonitrile. Any of the other such polymers may be modified by the inclusion of another monomer such as acrylonitrile, etc.

The fused resin blend of this invention is applied as a partitioning agent in a hot slurry of the crumb. The slurry may be formed by coagulation of the elastomeric latex or by dispersing pellets or ground crumb in water. This slurry must contain a coagulant, either an excess from the coagulation of a rubber latex, or that added when a slurry of pellets or ground crumb is prepared. The coagulant may, for example, be aluminum sulfate, magnesium sulfate, calcium chloride, calcium oxide, barium hydroxide, etc., or a mixture of sodium chloride and sulfuric acid used most often for SBR coagulation. The concentration of the rubber crumb and the nature and concentration of the coagulant in the slurry will vary, and may be anything which is usual in the industry. In the case of a crumb slurry prepared by coagulating a rubber latex the coagulation and the formation of the fused resin coating may be carried out either batchwise or continuously.

It has been discovered that blends of polymethyl methacrylate resin and styrene-butadiene copolymer resin have agglomeration temperatures intermediate between those of the individual components. Therefore, a blend ratio may be selected which will give a fusion of all or nearly all of the resin blend on the surface of the crumb particles at a reasonable slurry temperature of, for example, 90°–95° C., and provide a coating with a high enough softening temperature that the coated crumb may be dried at a high temperature of, for example, 85° C. or higher. Thus, advantages of both blend components are obtained.

The two components of the partitioning agent are used in a ratio of about 50 to 80 parts by weight of the styrene-butadiene copolymer and 50 to 20 parts by weight of the polymethyl methacrylate; and preferably 70 parts of the copolymer and 30 parts of the polymethyl methacrylate. Thus the agglomeration temperature of the blend may vary substantially, and generally will be in the range of about 85° to 95° C. and preferably substantially 90° C.

In the practice of the invention the slurry of the rubber crumb particles with coagulant present is heated to a temperature near or above the agglomeration temperature of the resinous blend of the partitioning agent. The two resinous components of the blend in the form of aqueous latices are blended and diluted to any usable concentration such as, for example, 0.1 percent to 10 percent of the weight of the latex, more or less, and preferably 2 percent by weight total solids, and heated to a temperature near that of the slurry of the coagulated rubber crumb. Then the hot, dilute resin latex is added slowly to the hot rubber crumb slurry with mild agitation. Under these conditions the resins in the latex blend are coagulated by the coagulant in the rubber crumb slurry and adhere to the surface of the rubber particles. Because the slurry temperature is near or above the agglomeration temperature of the resin blend, the components of the resin soften and fuse, and surprisingly, instead of the polymethyl methacrylate particles cohering to one another the resin blend adheres to the surface of the rubber particles. The concentration of the blend in the slurry may vary widely and should be regulated so that the amount of the blend present is sufficient to coat substantially the entire surface of the elastomeric particles.

The resin coating thus formed on the surface of the otherwise tacky rubber crumb particles is an effective partitioning agent. When the water is drained or filtered from the slurry of the coated crumb particles and they are dried, the particles resist sticking together if they are not held at too high a temperature after becoming essentially dry. The wet particles may enter a tunnel drier at a temperature considerably above the agglomeration temperature, such as 110° to 115° or 120° C. or thereabout, provided that as the water is removed the temperature is lowered, and the final drying may be accomplished at a temperature not over 85° C. or 95° C. or thereabout; depending upon the partitioning agent. Tunnel drying is not necessary, and in any method of drying the final temperature is critical and should not exceed about 80° to 95° C., or somewhat higher depending upon the composition of the partitioning agent, etc.

Usually the ratio of the weight of the coating resin to the weight of the elastomeric particles would be in the range of perhaps 1 to 25 percent or thereabout, and preferably 2 to 10 percent, depending on the particle size and the particle surface area.

Several examples follow. Examples 1 and 2 relate, respectively, to the prior-art use of polymethyl methacrylate and styrene-butadiene copolymer alone.

EXAMPLE 1

An SBR 1502 type latex is coagulated with salt and acid. To 300 g. of agitating latex containing 60 g. dry weight of rubber, 60 ml. of a solution containing 15 g. of NaCl is added and enough of a 1 percent solution of $H_2SO_4$ to lower the pH to about 5. This forms a slurry of elastomeric crumb particles of perhaps 1–10 mm. diameter in water. This slurry is heated to 95° C. An aqueous latex of polymethyl methacrylate (RHOPLEX B85 manufactured by Rohm & Haas) with an agglomeration temperature of >100° C. of 3 g. dry weight (5% of weight of rubber) is diluted to 2 percent total solids, heated to 85° C. and added slowly to the agitated slurry of rubber crumb. Under these conditions the polymethyl methacrylate resin is coagulated by the residual salt and acid in the slurry and a portion fuses on the surface of the crumb particles. When this is dried at 95° C. the coated rubber particles do not stick together, but a considerable portion of the polymethyl methacrylate coagulates separately and makes the product dusty. This partially fused coating is not nearly as effective in partitioning the rubber crumb as if all the resin were fused on the surface of the crumb particles.

EXAMPLE 2

A coagulated slurry of SBR rubber crumb is prepared as in Example 1 and heated to 70° C. Eight ml. of a styrene-butadiene resin latex with 38 percent total solids, a styrene content of 82.5 percent, and an agglomeration temperature of 65° C. is diluted with water to 2 percent solids and added slowly to the agitating slurry. The resin coagulates and almost all of it fuses together on the surface of the elastomer crumb particles. When this is dried at 65° C. no free resin is evident but the rubber particles stick together.

EXAMPLE 3

A slurry of rubber particles is prepared as in Example 1 and heated to 90° C. A blend of resinous latices of polymethyl methacrylate with an agglomeration temperature of >100° C. and a styrene-butadiene copolymer with a styrene content of 82.5 percent and an agglomeration temperature of 65° C. is made and diluted to 2 percent with water. The ratio of polymethyl methacrylate to the copolymer resin is 30/70 and the agglomeration temperature of the blend is 90° C. The dilute latex blend containing 3 g. dry weight of resin is heated to 85° C. and added slowly to the agitating rubber crumb slurry. The resins coagulate and fuse on the surface of the crumb particles. When the particles are dried at a temperature not over 90° C., there is little or no sticking of the particles, and little or no free resin present.

EXAMPLE 4

A bale of 1712 SBR-type oil extended rubber is ground to give a crumb of about 1/8–1/4 inch in particle size. Two pounds of this ground crumb is slurried in ten pounds of water containing 27 grams of $MgSO_4.7H_2O$ coagulant. The slurry is heated to 90° C. A two percent latex of a 70/30 mixture by weight of styrene-butadiene copolymer and polymethyl methacrylate latices containing four parts of resin per 100 parts of rubber crumb is prepared as in Example 3 and added to the rubber crumb slurry. The resin coats the surface of the ground rubber to serve as a partitioning agent. The water is drained off and the coated crumb is dried at 85° C.

EXAMPLE 5

To a cold NBR latex with 32 percent bound acrylonitrile and 68 percent butadiene; a Mooney viscosity, M/L-4 at 212° F., of 84; and a solids content of 20.5 percent is added an aqueous dispersion of a finely ground SRF (ASTM N762) carbon black. The black amounts to 75 percent by weight of dry rubber solids. A 1 percent solution of sulfuric acid is added to coagulate the black masterbatch in the form of a crumb. If needed to complete the coagulation of the NBR latex and clear the serum a coagulation aid such as Polyamine H, made by Union Carbide, is added. The rubber/black crumb is washed and fed to an extruder dryer. It is extruded through a die with holes 1/16-inch in diameter and cut with a cutter into dry pellets of ⅛-inch diameter and about ⅛-inch length. Forty pounds of these pellets are put into 250 pounds of water, and eight pounds of sodium chloride and 33 grams of concentrated sulfuric acid are added. The slurry is heated to 90° C. The 70/30 styrene-butadiene/polymethyl methacrylate resin blend in the form of a hot 2 percent latex is prepared as in Example 3 to give 4 parts/100 parts of the rubber black masterbatch. It is added to the hot rubber pellet slurry and the resin coats the surface of the pellets. The pellets are dried at 85° C. without sticking together and resist massing during storage.

EXAMPLE 6

A rubber latex is coagulated continuously and the resulting rubber crumb particles are coated continuously with a fused thermoplastic partitioning agent in this example. Two thousand nine hundred seventy pounds of a cold SBR 1713 latex with a solids of 19.9 percent, a M/L-4 at 212° F. of 135, and a bound styrene content of 23.5 percent is put into an agitated vessel. Five hundred ninety pounds of a 50 percent emulsion of a naphthenic, non-staining processing oil and a suitable antioxidant is added to the latex. This is 50 parts of oil/100 parts of rubber solids. The latex/oil blend is heated to 55° C. In another vessel a 0.7 percent solution of $Al_2(SO_4)_3.18H_2O$ (alum) is prepared and heated to 60° F. In a third vessel 260 gallons of water are heated to 93° C. with steam. Ninety seven pounds of a styrene-butadiene copolymer latex with 36.2 percent solids, and 39 pounds of a polymethyl methacrylate latex of 38.3 percent solids are added. This makes a 2.3 percent solids latex of the 70/30 blend of the two resin partitioning agents. This dilute latex is maintained at a temperature of 82° C. or higher. The oil/rubber latex mixture is run continuously to a 70-gallon coagulation tank at a rate of 0.95 gallons/minute, or a dry rubber rate of 130 pounds/hour. Alum solution and dilution water are also run continuously into the coagulation tank at 1 and 0.9 gallons/minute, respectively. The contents of this tank are kept at 60°–65° C. The alum coagulates the rubber latex and forms a slurry of the rubber crumb in water which overflows to a 400-gallon tank. In this second tank the slurry is heated to 90° C. with steam, and the hot 2.3 percent resin latex is added continuously at a rate of 3.8 pounds/minute which will give four parts/100 parts of the oil extended rubber. The hot slurry overflows to another 400-gallon tank where it is maintained at about 90° C., and another four parts of the resin partitioning agent latex is added continuously at a rate of 3.8 pounds/minute of the dilute latex. The slurry of the coated rubber particles then overflows to a 100-gallon tank where the coagulation of the resin latex is completed. Substantially all of the resin adheres to the surface of the particles. The slurry overflows to a continuous vacuum filter where the water is drained off the crumb and washing takes place. The wet rubber particles are then fed to a continuous apron or tunnel dryer with an air temperature of 85° C. There is some sticking together of the resin-coated crumb on the apron of the dryer, but the dry material crumbles apart easily to a free-flowing rubber crumb.

We claim:

1. The process of producing an elastomeric crumb, coated with a fused resinous partitioning agent which adheres to the crumb without substantial cohesion of the coated particles to one another, which process comprises coating a tacky polymer crumb, the particles of which measure 1 to 50 mm. across, using a latex blend of 0.1 to 10 percent solids content which is a blend of (a) 50 to 80 parts by weight of a styrene-butadiene copolymer resin with a styrene content of substantially 80 to 99 percent and (b) 50 to 20 parts by weight of a polymethyl methacrylate resin, the weight of the resin blend being 1 to 25 percent of the weight of the elastomeric crumb, using sufficient of the latex blend at a temperature substantially as high as 85° C. to coat the crumb, adding the resin latex blend containing a coagulant to a slurry of the rubber particles in water at a temperature of 90°–95° C. to coagulate the blend, and drying the coated crumb at a final temperature of at least 85° C. and not more than 95° C. whereby the coating adheres to the crumb without substantial cohesion of the coated particles.

2. In the process of applying a partitioning agent to a slurry of elastomeric particles and drying without substantial cohesion of the particles, the improvement which comprises preparing a dilute latex blend of (a) 50 to 80 parts by weight of a styrene-butadiene copolymer resin with a styrene content of substantially 80 to 99 percent and (b) 50 to 20 parts by weight of a polymethyl methacrylate resin, said latex blend having a solids content of 0.1 to 10 percent, coagulating a latex of the elastomer to form particles which measure 1 to 50 mm. across in an aqueous medium containing coagulant in slight excess of that necessary to coagulate the elastomeric particles; mixing the two resin latices to produce the blend, using sufficient of the latex blend at a temperature above 85° C. to coat the elastomeric particles sufficiently to prevent the agglomeration of the coated particles during drying, coagulating the latex blend and drying the coated particles using a final temperature of at least 85° C. and not more than 95° C. wherby the coating adheres to the particles without substantial cohesion of the coated particles.

3. The process in claim 1 in which the polymer from which the crumb is produced is a butadiene-styrene rubber.

4. The process of claim 1 in which the polymer from which the crumb is produced has black masterbatch composition.

5. The process of claim 1 in which the polymer from which the crumb is produced has an oil masterbatch composition.

6. The process of claim 1 in which the polymer from which the crumb is produced has an oil black masterbatch composition.

7. The process of claim 2 in which the partitioning agent is a blend of substantially 70 parts of the copolymer and 30 parts of the polymethyl methacrylate, and the final drying temperature of at least 85° C. and no more than 110° C.

8. The process of claim 2 in which the concentration of the components in the latex of the partitioning agent was not over 2 percent by weight.

9. The process of claim 1 in which the polymer crumb is extruded as a strand measuring no more than substantially 50 mm. in the largest dimension, dividing the strand into lengths no more than substantially 50 mm. in length, forming an aqueous slurry therefrom, and coating the resulting crumb particles with the blend.

10. The process of claim 1 in which the crumb is obtained by grinding, forming a slurry from the ground particles and coating the particles.

11. The process of claim 1 in which the polymer crumb is coated and dried in a continuous process.

12. The process of claim 1 in which the polymer crumb is obtained in a continuous coagulation process and is then coated and dried in a continuous process.

13. The process of claim 1 in which the weight of the resin blend is 2 to 10 percent of the weight of the polymer crumb.

14. The process of claim 2 in which the solids content of the latex blend is 2 to 10 percent of the weight of the latex.

15. The process of claim 2 in which the styrene content of the copolymer does not exceed 85 percent.

16. In the process of applying a fused, resinous partitioning agent to a slurry of elastomeric particles whereby the partitioning agent adheres as a coating to the particles without substantial cohesion of the coated particles, the improvement which comprises coagulating a latex of the elastomer to form particles which measure 1 to 50 mm. in diameter in an aqueous medium containing coagulant in slight excess of that necessary to coagulate the elastomeric particles and heating the coagulated slurry to a temperature above 85° C., preparing a dilute latex blend of (a) 50 to 80 parts by weight of a styrenebutadiene copolymer resin with a styrene content of substantially 80 to 99 percent and (b) 50 to 20 parts by weight of a polymethyl methacrylate resin, said latex blend having a solids content of 0.1 to 10 percent, heating the resin latex blend to a temperature of at least 85° C.; adding this hot latex blend to a hot slurry of elastomeric particles to coagulate the resin and fuse it on the surface of the particles thereby coating them with resin amounting to 1 to 25 percent of the weight of the elastomer; and drying the coated particles using a final temperature of at least 85° C. and not more than 110° C. whereby the partitioning agent adheres to the particles without substantial cohesion of the particles.

* * * * *